(12) United States Patent
Aoki et al.

(10) Patent No.: US 6,493,145 B1
(45) Date of Patent: *Dec. 10, 2002

(54) SOLAR LIGHTING APPARATUS

(75) Inventors: Hideaki Aoki, Kyoto (JP); Kenji Taguchi, Hirakata (JP)

(73) Assignee: Sanyo Electric Co., Ltd., Osaka (JP)

( * ) Notice: Subject to any disclaimer, the term of this patent is extended or adjusted under 35 U.S.C. 154(b) by 39 days.

This patent is subject to a terminal disclaimer.

(21) Appl. No.: 09/630,550

(22) Filed: Aug. 1, 2000

(30) Foreign Application Priority Data

Apr. 28, 2000 (JP) .......................... 2000-128715

(51) Int. Cl.⁷ .......................... G02B 27/00; G02B 5/10; G02B 5/08; G02B 7/182; G03B 21/00
(52) U.S. Cl. .................. 359/597; 359/591; 359/851; 359/853; 353/3
(58) Field of Search ............... 359/591, 597, 359/853, 851; 353/3

(56) References Cited

U.S. PATENT DOCUMENTS 5,493,824 A * 2/1996 Webster et al. ............ 52/200
5,999,323 A * 12/1999 Wood .................. 359/591

\* cited by examiner

*Primary Examiner*—Christopher Mahoney
*Assistant Examiner*—Magda Cruz
(74) *Attorney, Agent, or Firm*—Arent Fox Kintner Plotkin & Kahn

(57) ABSTRACT

A solar lighting apparatus includes a transparent dome. The transparent dome is provided, at its ceiling center, with a control box accommodating a stepping motor, a controller for controlling the motor and a secondary battery. The stepping motor has a motor shaft coupled with a rotary shaft. On the rotary shaft is coupled a support frame member through a universal joint. The rotary shaft is driven by the motor to turn a reflection mirror held on the support frame member over a predetermined angle while tracking the sun.

9 Claims, 5 Drawing Sheets

F I G. 3
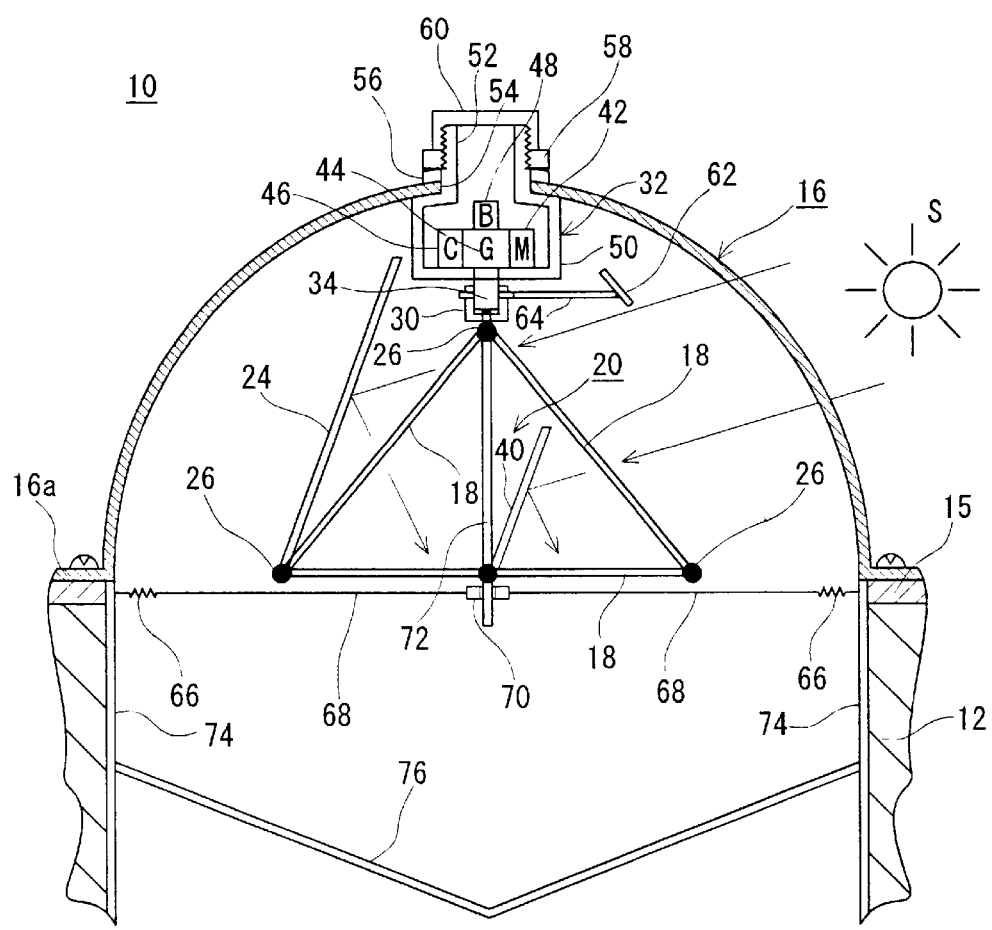

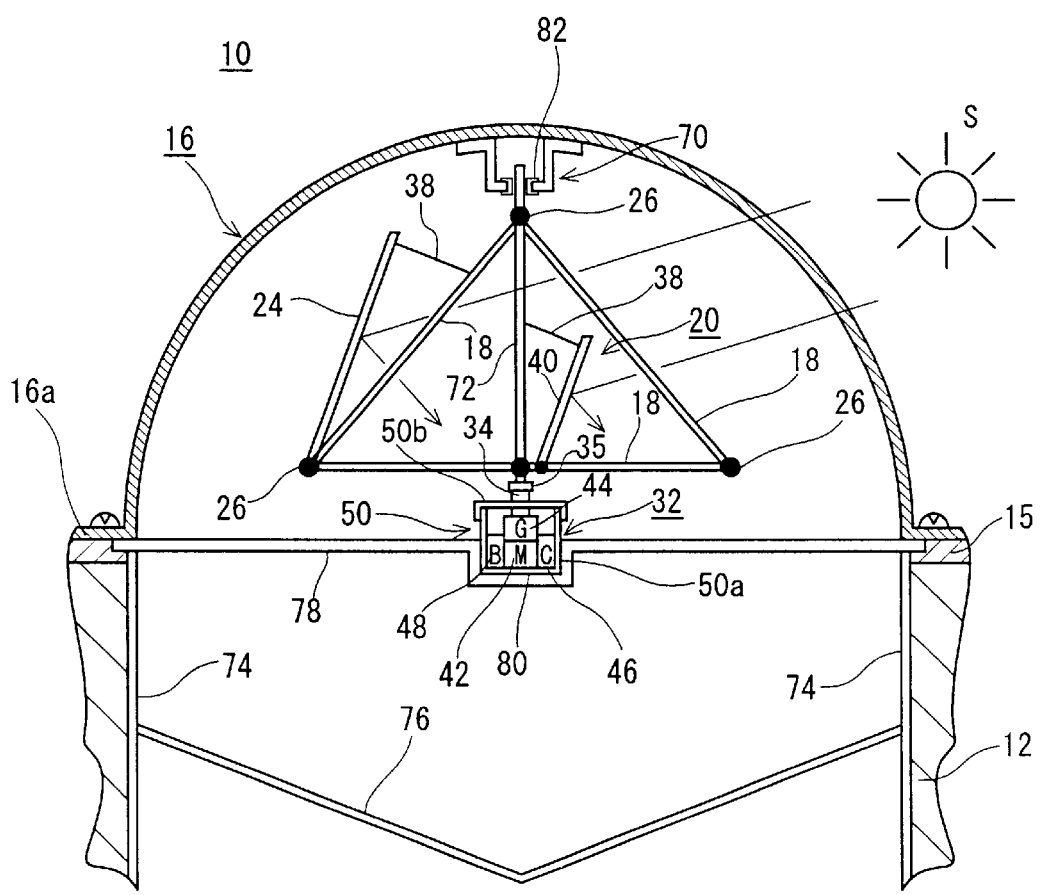
F I G. 5

SOLAR LIGHTING APPARATUS

BACKGROUND OF THE INVENTION

1. Field of the invention

This invention relates to solar lighting apparatuses and, more particularly, to a solar lighting apparatus having, within a transparent dome, a rotatively-driven reflection mirror to reflect solar light to be introduced into an inside of a building.

2. Description of the Prior Art

In the building such as a house, direct lighting with solar light is possible only to the room opening on an outside. An aperture such as top lighting or vertical well is provided in a center or north part of the building. Thus, solar light is supplied through the aperture to an inside of the building thus supplying light to the inside.

In the aperture, a solar lighting apparatus is installed which has a reflection mirror to be controlled in inclination angle depending upon a position of the sun. The solar light reflected by the reflection mirror is then introduced into the building.

The solar lighting apparatus has a transparent dome having therein a lighting apparatus having a rotatable reflection mirror to allow tracking a position of the sun. The rotatable reflection mirror has a plurality of reflection plates arranged in a cantilever form at a predetermined interval on a support member structured by rolled members, such as angles. The rotatable reflection mirror has a rotary shaft at its center. The rotatable reflection mirror is coupled, in a state directed upward and cantilever-supported, to a rotary drive shaft (see, e.g. the Specification and Drawings of U.S. Pat. No. 5,999,323).

Meanwhile, separately provided are the motor and drive gear arrangement for driving the rotary drive shaft and its control circuit. These are connected through wiring laid in the transparent dome.

The drive motor and drive gear arrangement positioned at a lower center in the transparent dome and its controller are arranged separate from each other. The drive motor and the controller are connected through wiring.

However, in a situation they are being used, the transparent dome at an inside thereof is put in hot due to the affection of the external environment. This also has an effect upon the connection points electrically connecting between component parts. This results in a problem with lowering the apparatus overall reliability.

SUMMARY OF THE INVENTION

Therefore it is a primary object of the present invention to provide a novel solar lighting apparatus.

Another object of the invention is to make a drive motor, a controller and the like as a unit thereby providing a solar lighting apparatus facilitated in maintenance and inspection.

The present invention is a solar lighting apparatus, comprising: a dome formed of a transparent material; a mirror supported in said dome to be rotated through a rotary shaft; a control box provided fixed in the dome; a motor provided in the control box and driving the rotary shaft; and a controller provided in the control box and controlling the motor.

The present invention makes as a unit the motor for rotatively driving the mirror arranged in the dome and fixedly held on the support member, the controller for controlling the motor and the battery. This allows for reduction in the number of parts or assembling processes. Also, the electrical connection point is also accommodated in the control box, reducing exposed mechanical parts and hence improving reliability.

According to the invention, making the motor, the controller and the like as a unit facilitates maintenance and inspection and reducing cost.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 3 is an illustrative view in section of an essential part of another embodiment of the invention;

FIG. 5 is an illustrative view of an essential part section according to still another embodiment of the invention.

DETAILED DESCRIPTION OF THE PREFERRED EMBODIMENTS

Figure 1:
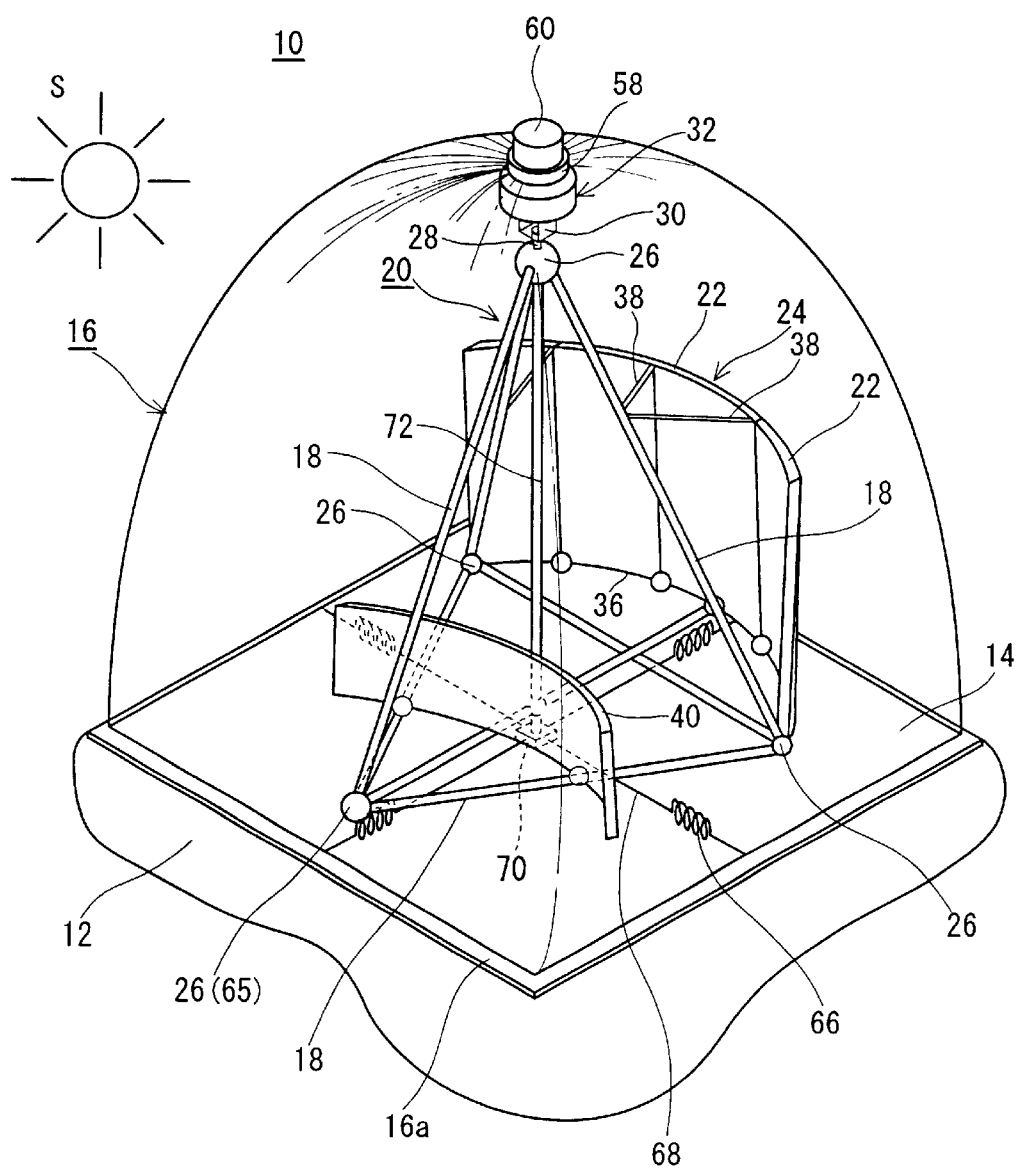
FIG. 1 is a perspective view showing a schematic structure of a solar lighting apparatus according to one embodiment of the present invention.
Figure 2:
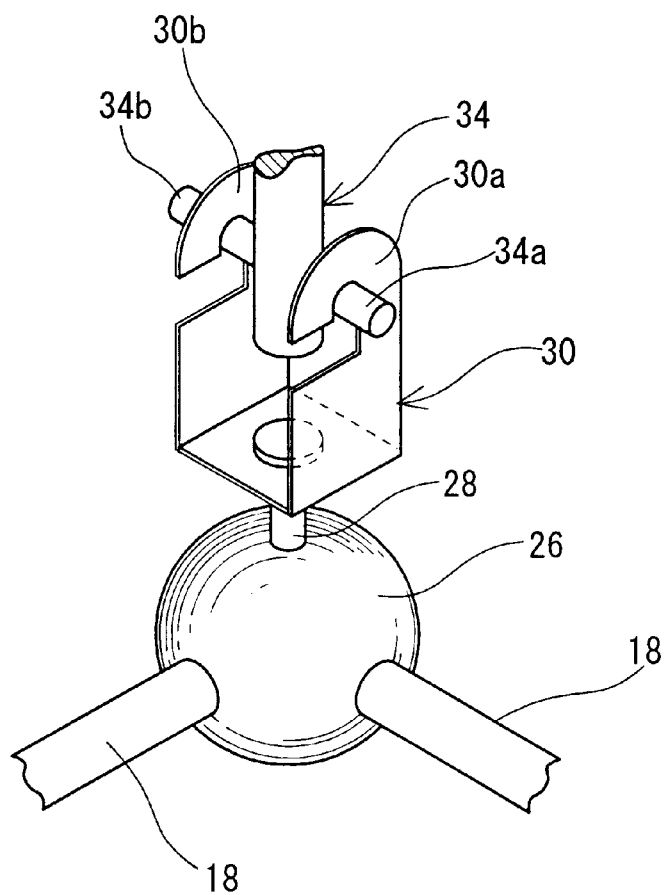
FIG. 2 is an illustrative view showing a suspender part of FIG. 1.

A solar lighting apparatus 10 as one embodiment of the invention shown in FIG. 1 is set up at a lighting aperture 14, such as a top lighting or vertical well, provided in a building 12, e.g. a house. The solar lighting apparatus 10 includes a transparent dome 16 having a mounting flange 16a for fixing by screws or the like on a mount frame 15 in a manner covering the lighting aperture 14, a support frame member 20 arranged in a suspension state in the dome 16 and structured by connecting light-weighted rolled members 18, 18, . . . such as thin-walled aluminum pipes, and a reflection mirror 24 having a plurality of flat plates or reflection panels having secondary curved surfaces 22, 22, . . . mounted on the support frame member 20.

The transparent dome 16 is formed by working a transparent acrylic or polycarbonate resin plate having an even thickness of approximately 3 to 5 mm. The aperture 14 in this embodiment is in a square (rectangular) form having a side length of approximately 120 cm. Alternatively, it may be in circular if required. In such a case, the transparent dome 16 should be changed in form from the dome shape adapted for the squared aperture 14 to a semi-spherical form. Incidentally, although the transparent dome 16 is structured by a transparent acrylic resin plate or the like as above, a reinforcement rib (not shown) may be provided at an inner side thereof as required. For the dome 16, external air is prevented from entering through the aperture 14 to the indoor. Meanwhile, the reflection mirror 24, etc. are prevented from being contaminated with dusts.

The support frame member 20 is formed generally in a triangular pyramidal form by the connection of six thin-walled aluminum pipes 18, 18, . . . and has junctions coupled with spherical joints 26. Each of these joints 26, although not shown, has a required number of insertion holes or projections for insertion by the pipe 18. Meanwhile, the joint 26 positioned at a top of the support frame member 20 has a suspender 30 fixed through a support shaft 28. This suspender 30 has a pair of hooks 30a, 30b for engagement with support pins 34a, 34b of the rotary shaft 34 having a drive control unit 32 to be positioned at a ceiling center (top) of the dome 16, thus constituting a universal joint. This structure allows a support frame member 20 to be rotatively supported in a suspension state in the dome 16.

The universal joint eliminates bending moment occurring at the rotary part, thereby reducing drive torque required. Incidentally, although the support frame member 20 in this embodiment is formed generally in the triangular pyramidal form, it may be formed generally in a square pyramidal form as another embodiment. Also, the support frame member 20 may be in other arbitrary forms besides the squared pyramid. Furthermore, although the support frame member 20 in this embodiment is coupled to the rotary shaft 34 through the universal joint mechanism, the support member may be directly fixed on a rotary shaft of a motor 42 (described later).

Meanwhile, the reflection mirror 24 fixedly supported on the support frame member 20 is structured, for example, by a combination of reflection panels 22 each having a secondary curved surface. Each reflection panel 22 in a lower edge is supported by an arcuate support member 36 having respective ends fixed by the joints 26, 26 on the thin-walled aluminum pipe forming a bottom of the support frame member 20. The reflection panel 22 in an upper edge is supported by the thin-walled aluminum pipes 18, 18 forming a side plane of the support frame member 20 through a support pipe 38.

An auxiliary reflection mirror 40 having a secondary curved surface is provided in the vicinity of a bottom center of the support frame member 20. This auxiliary reflection mirror 40 is provided, spaced by a predetermined spacing, in front of the reflection mirror 24 in order to increase the efficiency of lighting of radiation light of the sun S. The auxiliary reflection mirror 40 has a height dimension set low such that the auxiliary reflection mirror 40 will not shield the solar S radiation light from reaching the reflection mirror 24.

Incidentally, the reflection mirror 24 and the auxiliary reflection mirror 40 may be structured with one flat reflection panel. Meanwhile, the reflection panel 22 in a flat plate or secondary curved surface form can be formed, for example, by laminating on a light-weighted polystyrene plate a resin film having a mirror-like surface formed by aluminum evaporation.

The drive control unit 32 includes, as shown in FIG. 3, a stepping motor 42, a drive gear 44 for delivering a rotation force of the motor 42 to the rotary shaft 34, a controller (including a micro-computer) for controlling rotation of the motor 42 and a battery 48 for supplying power to the motor 42 and controller 46. These are all accommodated in a control box 50.

The control box 50 has a cylindrical opening 52 formed with a helical part on an outer periphery thereof. This cylindrical opening 52 is inserted in a mount hole 54 formed at a ceiling center (top) of the transparent dome 16. Through an annular packing 56 a fixing nut 58 is screwed to the helical part, thereby fixing the control box 50 in the transparent dome 16. Also, a water-preventing lid 60 for opening and closing is attached on an opening end of the cylindrical opening 52. The opening and closing the lid 60 as required allows for inspection and repair of the above part accommodated within the box 50 from an outside of the dome 16 and positional adjustment of the support frame member 20 including the rotary shaft 34. For example, it is possible to open the water preventing lid 60 from the outside of the dome 16 to inspect or exchange the battery 48 accommodated in the controlled box 50.

Also, the drive gear 44 use a bevel gear mechanism of a reduction speed type capable of converting a rotational force about a horizontal axis of the motor 42 into a rotational force about a vertical axis. This cause the reflection mirror 22 and auxiliary reflection mirror 40 supported on the support frame member 20 to turn once per day (360°/24H=15°/H) in accordance with a position of the sun S. For this purpose, it is possible to use a timer function of a controller including a micro-computer or a timepiece movement as a drive control unit 32.

For example, by a pulse signal from the controller 46 including a micro-computer, the stepping motor 42 is turned over a predetermined angle. The rotatable drive force of the stepping motor 42 rotate the support frame member 20 over a predetermined angle thereby rotating over a predetermined angle the reflection mirror 24 and auxiliary reflection mirror 40 supported on the support frame member 20. As a result, the reflection mirror 24 and auxiliary reflection mirror 40 are controlled of drive to a direction toward the sun S.

Incidentally, the sun S is different in position depending upon a regional latitude, season of the year and time of the day. However, if value throughout the year of a region where a building 12 such as a house having the solar lighting apparatus 10 exit are previously stored in a micro-computer, the reflection mirror 24, etc. can be controlled in rotation based on that data according to the movement of the sun S. This will be described later.

Meanwhile, the battery 48 in this embodiment is a secondary battery. Furthermore, the rotary shaft 34 is fixed with a support member 64 provided with a solar battery panel 62 on one of the support pins 34a, 34b. Because this solar battery panel 62 is fixed to the rotary shaft 34 through the support member 64, it track the sun S thus performing solar power generation with efficiency. The electric power obtained on the solar battery panel 62 is charged to the second battery 48.

It is noted that commercial power supply, in place of the secondary battery 48, can be used as a power source to the motor 42 and controller 46.

Furthermore, a proper balancer (ballast) 65 is provided on the support frame member a required, in order to horizontally balance the support frame member 20 suspended by the rotary shaft 34 of the drive control unit 32 in a state of mounting the reflection mirror 24 and auxiliary reflection mirror 40. This balancer 65 in this embodiment serves also a the joint 26. Also, in order to prevent against winging due to rotation, a pivotal hole part is provided at a lower center in the transparent dome 16, i.e. resiliently supported on a rotation axis through coil spring 66 and wire 68 to respective side center of a rectangular mount frame 15 in the aperture 14. In this pivotal hole part 70 is inserted a lower end of a center support member (rotation center axis) 72 fixed on the support frame member 20.

Figure 4:
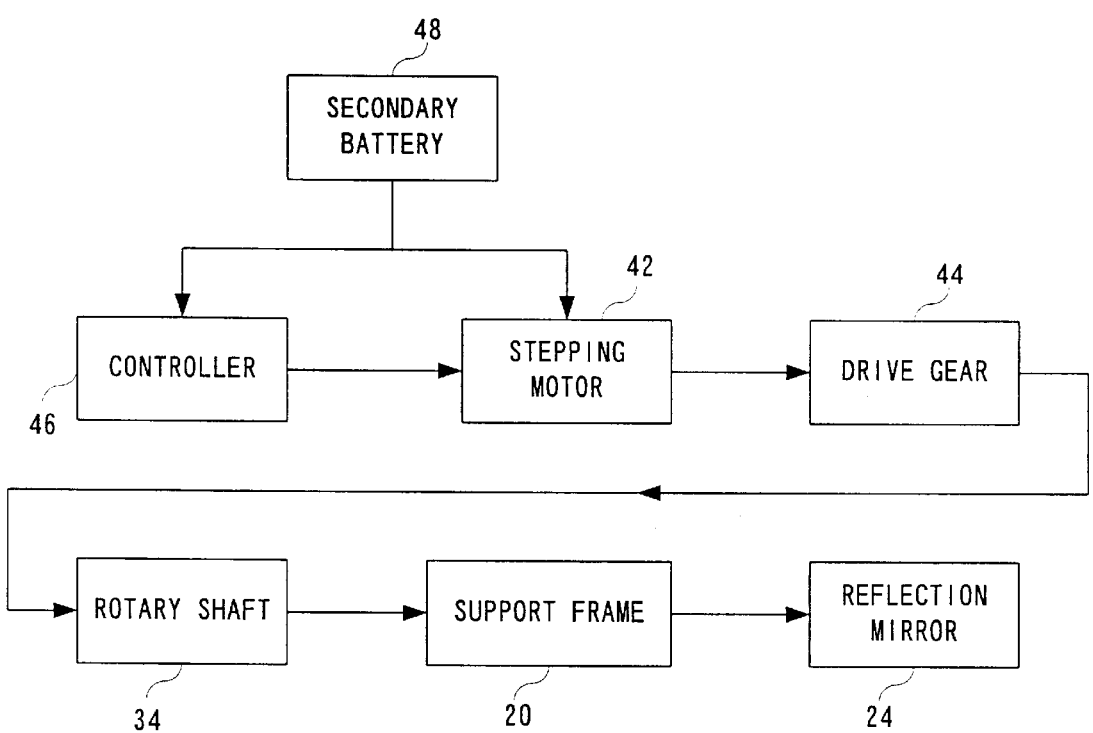
FIG. 4 is a block diagram showing a rotary drive mechanism of the one embodiment of the invention.

Next, the operational outline of the solar lighting apparatus 10 as the one embodiment of the invention will be explained with reference to FIG. 3 and FIG. 4.

First, a power switch, not shown, is turned on to feed electricity from the secondary battery 48 of the drive control unit 32 to the stepping motor 42 and controller 46. The support frame member 20 suspended in the transparent dome 16 is rotated by 180 degrees on the rotary shaft 34 by reducing, through the drive gear 44, rotation of the stepping motor 42 controlled in rotation by the controller 46, for a duration of from sunrise to sunset, e.g. for 12 hours of from 6 AM to 6 PM. This reduction of rotation causes the reflection mirror 24 and auxiliary reflection mirror 40 supported on the support frame member 20 to rotate by a predetermined angle depending upon a position of the sun S.

The solar radiation light reflected upon the reflection mirror 24 and auxiliary reflection mirror 40 is incident on the aperture 14 a shown by the solid-lined arrows in FIG. 3. The light is further reflected at an entrance to the aperture forming a mirror-like surface 74 and then transmitted through the light diffusion plate 76 thereby illuminating the indoor.

The support frame member 20 further rotate by 180 degrees for 12 hours of from 6:00 PM after sunset to 6:00 AM in the tomorrow morning. Due to the rotation, the reflection mirror 24 and auxiliary reflection mirror 40 make one turn returning to the former position. Thereafter, operation is repeated similarly.

Incidentally, in any of the embodiments shown in FIG. 1 and FIG. 3, the drive control unit 32 accommodated in the control box 50 is arranged at the top of the transparent dome 16. Alternatively, it may be arranged in a lower center of the transparent dome 16 as in another embodiment shown in FIG. 5.

In this case, the control box 50 is structured by a box main body 50a and a lid 50b opening and closing the opening at a top face of the main body. The box main body 50a is rested and fixed, for example, in a recess 80 of a mounting plate 78 provided horizontal in an aperture of a house. Further, a rotary shaft 34 is extended out of the lid 50b which is coupled to a motor shaft of a motor 42 through a drive gear arrangement 44. To the rotary shaft 34 is coupled through a universal joint 35 a support frame member 20 fixed with a reflection mirror 24 and auxiliary reflection mirror 40. Thus, the support frame member 20 can be rotated in the transparent dome 16 by the drive control unit 32. In also this case, a pivotal hole part 70 having, e.g., a resilient ring 82, is fixed on a rotation axis in a position of a top inner surface of the dome 16. In this pivotal hole part 70 is inserted a top end of a center support member (rotation center shaft) 72 fixed on the support frame member 20 thereby preventing against wing in the support frame member 20 due to rotation. Incidentally, the center support member 72 in it lower end is coupled to the rotary shaft 34 through the universal joint 35. For example, the rotary shaft 34 and the lower end of the center support member 72 are coupled by a non-circular concavo-convex engagement.

As explained above, by accommodating the drive control unit 32 within the control box 50 into a unit form, it is possible to reduce the number of parts and assembling processes thereby reducing cot and decreasing the mechanism exposure hence improving reliability. Furthermore, required maintenance and inspection is made easy to carry out.

The azimuth/altitude of the sun, a stated before, is to be determined by the following Equations.

$$\tan A = \frac{-\cos\delta \cdot \sin t}{\sin\delta \cdot \cos\psi - \cos\delta \cdot \sin\psi \cdot \cos t} \qquad \text{[Equation ①]}$$

$$\sin h = \sin\delta \cdot \sin\psi + \cos\delta \cdot \cos\psi \cdot \cos t \qquad \text{[Equation ②]}$$

A: azimuth
h: altitude
$\delta$: solar declination (calculated from Equation ②)
$\psi$: latitude at observation (input value)

t: solar hour angle (t=Θ−α, Θ: sidereal time, α: declination (calculated from Equation ⑩)
where the azimuth A in north is taken 0° to increase the angle in a direction a north→east→south→west. Incidentally, the quadrant of azimuth A is determined by the following relationship.

TABLE 1

Determining Azimuth Quadrant

| | |
|---|---|
| Positive in denomination of Equation ① | −90° < A < 90° |
| Negative in denomination of Equation ① | 90° < A < 270° |
| Zero in denomination of Equation ① | |
| sin t > 0 | A = −90° |
| sin t < 0 | A = 90° |
| sin t = 0 | h = 90° A not constant |

When minus in the denominator, a correct value A is obtainable by adding 180° to a value A calculated with an inverse trigonometric function $\tan^{-1}$.

Next, calculations are made to determine parameters of Equations ① and ②.

First, an altazimuth Julian year T and a sidereal time Θ are calculated from J2000.0 (2000/Jan./1$^{st}$/noon in dynamical-time). It is herein assumed that, in a region an observation point is located, a time differential is I hours and the observation point is at a longitude of λ.

Provided that, in this site point, a lapse of days is K' from J 2000.0 to (2000+Y)/Mth month/Dth day/0 o'clock (in local time), $$K'=365Y+30M+D-33.5-I/24+[3(M+1)/5]+[Y/4] \qquad \text{[Equation ③]}$$

Where [ ] means a Gauss notation representing a maximum integer of not exceeding a numeral within [ ]. Also, for January and February, calculations are made as 13th month and 14th month of the preceding year. For example, for Feb. 14, 2001, calculation will be as 2000/14th month/14th day.

Using K', determined is an altazimuth Julian year is T to (2000+Y)/Mth/month/Dth day/G o'clock/m minute (in local time). Then, we obtain:

$$T=(K'+G/24+m/1440+\Delta T/86400)/365.25 \qquad \text{[Equation ④]}$$

Note that ΔT represents a delay of earth rotation in second at a time of calculation, and it may be:

ΔT=65 (second).

From this, a solar longitude λs is determined.

λs=280° 0.4603+360° 0.00769T

+(1° 0.9146 −0° 0.00005T) sin (357° 0.538+359° 0.991T)

+0° 0.0200 sin (355° 0.05+719° 0.981T)

+0° 0.0048 sin (234° 0.95+19° 0.341T)

+0° 0.0020 sin (247° 0.1+329° 0.64T)

+0° 0.0018 sin (297° 0.8+4452° 0.6T)

+0° 0.0018 sin (251° 0.3+0° 0.20T)

+0° 0.0015 sin (343° 0.2+450° 0.37T)

+0° 0.0013 sin (81° 0.4+225° 0.18T)

+0° 0.0008 sin (132° 0.5+659° 0.29T)

+0° 0.0007 sin (153° 0.3+90° 0.38T)

+0° 0.0007 sin (206° 0.8+30° 0.35T)

+0° 0.0006 sin (29° 0.8+337° 0.18$T$)

+0° 0.0005 sin (207° 0.4+1° 0.50$T$)

+0° 0.0005 sin (291° 0.2+22° 0.81$T$)

+0° 0.0004 sin (234° 0.9+315° 0.56$T$)

+0° 0.0004 sin (157° 0.3+299° 0.30$T$)

+0° 0.0004 sin (21° 0.1+720° 0.02$T$)

+0° 0.0003 sin (352° 0.5+1079° 0.97$T$)

+0° 0.0003 sin (329° 0.7+44° 0.43$T$)     [Equation ⑤]

Also, an ecliptic inclination angle ϵ is to be determined by the following Equation.

$$\epsilon = 23°\ 0.439291 - 0°\ 0.000130042T \quad \text{[Equation ⑥]}$$

From this a solar right-ascension and declination are determined a follows:

$$\tan \alpha = \tan \lambda s \cdot \cos \epsilon \ (\alpha: \text{right-ascension}) \quad \text{[Equation ⑦]}$$

$$\sin \delta = \sin \lambda s \cdot \sin \epsilon \ (\delta: \text{declination}) \quad \text{[Equation ⑧]}$$

α and λs are in a same quadrant at all times.
When 0° ≤ λs < 180°, 0° ≤ α < 180°
When 180° ≤ λs < 360°, 180° ≤ α < 360°
Meanwhile, a sidereal time Θ is determined from the following Equation.

$$\Theta = 100°\ 0.4606 + 360°\ 0.007700536 \cdot T + 0°\ 0.00000003879 \cdot T^2 - 15° \cdot I + \lambda + 360° \cdot d \quad \text{[Equation ⑨]}$$

λ: longitude at observation site (plus in east longitude)
d: value in day decimal of a lapse of days from 0 o'clock in local time (e.g. 14 o'clock is given as d=14/24)
From Equations ⑦ and ⑨, a solar hour angle is determined a follows:

$$t = \Theta - \alpha \quad \text{[Equation ⑩]}$$

By the above, the parameters required to calculate Equations ① and ② are calculated.

Therefore, a solar azimuth and altitude at that time can be determined by providing (2000+Y)/Mth month/Dth day/G o'clock/m minute, latitude and longitude at the observation site point.

Although the present invention has been described and illustrated in detail, it is clearly understood that the same is by way of illustration and example only and is not to be taken by way of limitation, the spirit and scope of the present invention being limited only by the term of the appended claims.

What is claimed is:

1. A solar light apparatus, comprising:
   a dome formed of a transparent material;
   a mirror supported in said dome to be rotated through a rotary shaft;
   a control box provided in said dome and is arranged fixed at a top of said dome;
   a motor provided in said control box and driving said rotary shaft; and
   a controller provided in said control box and controlling said motor.

2. A solar lighting apparatus according to claim 1, wherein said control box includes a water preventing lid to be opened and closed at an outside of said dome.

3. A solar lighting apparatus according to claim 2, wherein said control box has therein a battery to supply electric power to said motor and said controller, and said battery being to be exchanged by opening and closing said water preventing lid.

4. A solar lighting apparatus according to claim 3, further comprising a solar battery, wherein said battery is a secondary battery to be charged by said solar battery.

5. A solar lighting apparatus, comprising:
   a dome formed of a transparent material;
   a control box fixed at a top of said dome;
   a motor provided in said control box and having a motor shaft;
   a controller provided in said control box and controlling said motor;
   a rotary shaft coupled to said motor shaft and extending vertically from said control box;
   a support frame member attached to said rotary shaft; and
   a reflection mirror provided on said support frame member.

6. A solar lighting apparatus according to claim 5, further comprising a universal joint for coupling said support frame member to said rotary shaft.

7. A solar lighting apparatus according to claim 5 or 6, wherein said support frame member includes a pyramidal frame member structured in ridgelines by light weighted pipes.

8. A solar lighting apparatus according to claim 7, wherein said pyramidal frame member includes a balancer weight.

9. A solar lighting apparatus according to claim 5, further comprising a pivotal part provided in a lower center of said dome and pivotally supporting a lower end of a rotation center shaft of said support frame member.

\* \* \* \* \*